United States Patent
Gisin et al.

(10) Patent No.: US 7,929,690 B2
(45) Date of Patent: Apr. 19, 2011

(54) TWO NON-ORTHOGONAL STATES QUANTUM CRYPTOGRAPHY METHOD AND APPARATUS WITH INTER-AND INTER-QUBIT INTERFERENCE FOR EAVESDROPPER DETECTION

(75) Inventors: Nicolas Gisin, Vessy (CH); Grégoire Ribordy, Geneva (CH); Hugo Zbinden, Geneva (CH)

(73) Assignee: ID Quantique SA, Carouge (CH)

( * ) Notice: Subject to any disclaimer, the term of this patent is extended or adjusted under 35 U.S.C. 154(b) by 665 days.

(21) Appl. No.: 11/574,454

(22) PCT Filed: Sep. 1, 2005

(86) PCT No.: PCT/IB2005/002622
§ 371 (c)(1),
(2), (4) Date: Feb. 28, 2007

(87) PCT Pub. No.: WO2006/024939
PCT Pub. Date: Mar. 9, 2006

(65) Prior Publication Data
US 2008/0292099 A1    Nov. 27, 2008

Related U.S. Application Data

(60) Provisional application No. 60/606,793, filed on Sep. 2, 2004.

(51) Int. Cl.
*H04K 1/00* (2006.01)
(52) U.S. Cl. ............ 380/29; 380/46; 380/201; 380/255; 380/256; 380/277; 380/278; 380/283; 380/260

(58) Field of Classification Search ............ 380/29, 380/256, 263, 278, 283, 277, 260, 46, 201; 398/183
See application file for complete search history.

(56) References Cited

U.S. PATENT DOCUMENTS

| | | | |
|---|---|---|---|
| 6,897,434 B1 * | 5/2005 | Kumar et al. | 250/227.18 |
| 7,088,824 B1 * | 8/2006 | Takeuchi | 380/256 |
| 7,460,669 B2 * | 12/2008 | Foden et al. | 380/256 |
| 2003/0169880 A1 * | 9/2003 | Nambu et al. | 380/256 |
| 2004/0109633 A1 * | 6/2004 | Pittman et al. | 385/16 |
| 2005/0036624 A1 * | 2/2005 | Kent et al. | 380/277 |

(Continued)

FOREIGN PATENT DOCUMENTS
WO    WO 2004/047359    6/2004

OTHER PUBLICATIONS

Bennett, C, and Brassard, G. "Quantum Cryptography: Public Key Distribution and Coin Tossing," Proc. International Conference on Computers, Systems, & Signal Processing, Bangalore, India, Dec. 10-12, 1984. pp. 175-179.*

(Continued)

*Primary Examiner* — Ashok B Patel
*Assistant Examiner* — Gary Gracia
(74) *Attorney, Agent, or Firm* — Moetteli & Associés SàRL

(57) ABSTRACT

An apparatus and method for implementing a secure quantum cryptography system using two non-orthogonal states. For each qubit, the to emitter station prepares a quantum system in one of two non-orthogonal quantum states in the time-basis to code bit values. Intra- and inter-qubit interference is then used to reveal eavesdropping attempts. Witness states are used to help reveal attacks performed across the quantum system separation.

44 Claims, 7 Drawing Sheets

U.S. PATENT DOCUMENTS

| | | | |
|---|---|---|---|
| 2005/0047601 A1* | 3/2005 | Shields et al. | 380/283 |
| 2005/0059167 A1* | 3/2005 | Vitaliano et al. | 436/518 |
| 2005/0078827 A1* | 4/2005 | Tajima | 380/256 |
| 2005/0100351 A1* | 5/2005 | Yuan et al. | 398/214 |
| 2005/0157875 A1* | 7/2005 | Nishioka et al. | 380/46 |
| 2006/0010182 A1* | 1/2006 | Altepeter et al. | 708/250 |
| 2006/0023885 A1* | 2/2006 | Trifonov et al. | 380/256 |
| 2007/0076871 A1* | 4/2007 | Renes | 380/201 |

OTHER PUBLICATIONS

Bennett, C et al. "Experimental Quantum Cryptography," Journal of Cryptology, vol. 5, No. 1, 1992. pp. 3-28.*

Brassard, G et al. "Limitations on Practical Quantum Cryptography," Physical Review Letters, vol. 85, No. 6, Aug. 7, 2000. pp. 1330-1333.*

Gisin, N et al. "Quantum cryptography", Reviews of Modern Physics, vol. 74, No. 1, Jan. 2002. pp. 145-195.*

Elliott, C et al. "Quantum Cryptography in Practice," Proc. ACM SIGCOMM 2003, ACM Press, Aug. 2003, pp. 227-238.*

Elliott, C. "Quantum Cryptography", IEEE Security & Privacy, vol. 2, issue 4, Jul.-Aug. 2004. pp. 57-61.*

Physical Review Letters. May 25, 1992. Quantum Cryptography Using Any Two Nonorthogonal States. Charles H. Bennett.*

Marcikie, Riedmatten, W. Tittel, V. Scarani, H. Zbinden and N. Gisin, Time-bin entangled qubits for quantum communication created by femtosecond pulses, 2002.*

\* cited by examiner

TWO NON-ORTHOGONAL STATES QUANTUM CRYPTOGRAPHY METHOD AND APPARATUS WITH INTER-AND INTER-QUBIT INTERFERENCE FOR EAVESDROPPER DETECTION

CROSS REFERENCE TO RELATED APPLICATIONS

This application is the National Stage of International Application No. PCT/IB05/02622, filed Sep. 1, 2005, which claims the benefit of U.S Provisional Application No. 60/606,793, filed Sep. 2, 2004.

BACKGROUND OF THE INVENTION

1. Field of the Invention

This invention relates generally to the field of quantum cryptography, and more particularly to an apparatus and method for allowing two users to exchange a sequence of bits and to confirm its secrecy.

2. Description of the Prior Art

If two users possess shared random secret information (below the "key"), they can achieve, with provable security, two of the goals of cryptography: 1) making their messages unintelligible to an eavesdropper and 2) distinguishing legitimate messages from forged or altered ones. A one-time pad cryptographic algorithm achieves the first goal, while Wegman-Carter authentication achieves the second one. Unfortunately both of these cryptographic schemes consume key material and render it unfit for use. It is thus necessary for the two parties wishing to protect the messages they exchange with either or both of these cryptographic techniques to devise a way to exchange fresh key material. The first possibility is for one party to generate the key and to inscribe it on a physical medium (disc, cd-rom, rom) before passing it to the second party. The problem with this approach is that the security of the key depends on the fact that it has been protected during its entire lifetime, from its generation to its use, until it is finally discarded. In addition, it is unpractical and very tedious.

Because of these difficulties, in many applications one resorts instead to purely mathematical methods allowing two parties to agree on a shared secret over an insecure communication channel. Unfortunately, all such mathematical methods for key agreement rest upon unproven assumptions, such as the difficulty of factoring large integers. Their security is thus only conditional and questionable. Future mathematical developments may prove them totally insecure.

Quantum cryptography (QC) is a method allowing the exchange of a secret key between two distant parties, the emitter and the receiver, with a provable absolute security. An explanation of the method can be found in Nicolas Gisin, Grégoire Ribordy, Wolfgang Tittel, and Hugo Zbinden, "Quantum Cryptography", Rev. of Mod. Phys. 74, (2002), the content of which is incorporated herein by reference thereto. One party—the emitter—encodes the value of each binary digit—or bit—of the key on a quantum system, such as a photon, by preparing this quantum system in a corresponding quantum state. A quantum system carrying a bit of the key is known as a qubit. The qubits are sent over a quantum channel, such as an optical fiber, to the other party—the receiver—which performs a quantum measurement to determine in which quantum state each qubit has been prepared. The results of these measurements are recorded and are used to produce the key. The security of this method comes from the well-known fact that the measurement of the quantum state of an unknown quantum system induces modifications of this system. This implies that a spy eavesdropping on the quantum channel cannot get information on the key without introducing errors in the key exchanged between the emitter and the receiver. In equivalent terms, QC is secure because of the no-cloning theorem of quantum mechanics: a spy cannot duplicate the transmitted quantum system and forward a perfect copy to the receiver.

Several QC protocols exist. These protocols describe how the bit values are encoded on quantum systems using sets of quantum states and how the emitter and the receiver cooperate to produce a secret key. The most commonly used of these protocols, which was also the first one to be invented, is known as the Bennett-Brassard 84 protocol (BB84), disclosed by Charles Bennett and Gilles Brassard in Proceedings IEEE Int. Conf. on Computers, Systems and Signal Processing, Bangalore, India (IEEE, New York, 1984), pp. 175-179, the content of which is incorporated herein by reference thereto. The emitter encodes each bit he wants to send on a two-level quantum system to prepare a qubit. Each qubit can be prepared either as an eigenstate of $\sigma_x$ ($|+x\rangle$ coding for "0" and $|-x\rangle$ coding for "1") or as an eigenstate of $\sigma_y$ ($|+y\rangle$ or $|-y\rangle$, with the same convention). One says that the bits are encoded in two incompatible bases. For each bit, the emitter uses an appropriate random number generator to generate two random bits of information, which are used to determine the bit value (one random bit) and the basis information (one random bit). Each qubit is sent across the quantum channel to the receiver, who analyses it in one of the two bases, i.e measures either $\sigma_x$ or $\sigma_y$. The receiver uses an appropriate random number generator to produce a random bit of information which determines the measurement basis (the basis information). The measurement basis is selected randomly for each qubit. After the exchange of a large number of quantum systems, the emitter and the receiver perform a procedure called basis reconciliation. The emitter announces to the receiver, over a conventional and public communication channel the basis x or y (eigenstate of $\sigma_x$ or $\sigma_y$) in which each qubit was prepared. When the receiver has used the same basis as the emitter for his measurement, he knows that the bit value he has measured must be the one which was sent over by the emitter. He indicates publicly for which qubits this condition is fulfilled. The corresponding bits constitute the so-called raw key. Measurements for which the wrong basis was used are simply discarded. In the absence of a spy, the sequence of bits shared is error free. Although a spy who wants to get some information about the sequence of qubits that is being exchanged can choose between several attacks, the laws of quantum physics guarantee that he is not able to do so without introducing a noticeable perturbation in the key. The security of the BB84 protocol relies on the fact that the qubits sent by the emitter are prepared in quantum states belonging to incompatible bases. For a given qubit, it is thus not possible for an eavesdropper to determine its quantum state with absolute certainty. More generally, the BB84 protocol belongs to a class of protocols where at least two quantum states, in at least two incompatible bases, are used.

In practice, one has to use imperfect apparatuses, which implies that some errors are present in the bit sequence, even without interaction of the eavesdropper with the qubits. In order to still allow the production of a secret key, the basis reconciliation part of the protocol is complemented by other steps. This whole procedure is called key distillation. The emitter and the receiver check the perturbation level, also known as quantum bit error rate (QBER), on a sample of the bit sequence in order to assess the secrecy of the transmission. Provided this error rate is not too large, it does not prevent the distillation of a secure key, also known as the distilled key, from the raw key. The errors can indeed be corrected, before the two parties apply a so-called privacy amplification algorithm that reduces the information amount that the eavesdropper could obtain to an arbitrarily low level.

Several other quantum cryptography protocols have been proposed. In 1992, Charles Bennett showed that it is sufficient to prepare the qubits in one of two non-orthogonal states and disclosed the so-called B92 protocol in Phys. Rev. Lett. 68, 3121 (1992), the content of which is incorporated herein by reference thereto. In this case, the emitter repeatedly sends qubits in one of two pure states $|u_1\rangle$ or $|u_2\rangle$, which are non-orthogonal. It is not possible for the receiver to distinguish between them deterministically. However, he can perform a generalized measurement, also known as a positive operator value measurement, which some-times fails to give an answer, but at all other times gives the correct one (formally this measurement is a set of two projectors $P_1 = 1 - |u_2\rangle\langle u_2|$ and $P_2 = 1 - |u_1\rangle\langle u_1|$). The results of this measurement on the qubits are used to generate bits of key. The fact that only two states are necessary means that this protocol is easier to implement in practice. It is nevertheless important to realize that an eavesdropper can also perform the generalized measurement. When he obtains an answer, he can forward a qubit prepared accordingly, while not doing anything when the result is inconclusive. This attack is particularly powerful in real apparatuses, where the receiver expects to detect only a small fraction of the qubits sent by the emitter, because of quantum channel attenuation and limited detector efficiency. When using mixed states $Q_1$ and $Q_2$ instead of pure states $|u_1\rangle$ or $|u_2\rangle$, which is the case in practice, ft is nevertheless possible to foil this attack by ensuring that the mixed states selected span two disjoint subspaces of Hilbert space. This allows the receiver to find two operators $P_1$ and $P_2$, such that $P_1$ annihilates $Q_2$ and $P_2$ annihilates $Q_1$, but no state is annihilated by both operators. This guarantees that if the eavesdropper sends a vacuum state instead of one of the mixed states $Q_1$ and $Q_2$, the receiver still registers conclusive measurement results, which introduce errors with a non-zero probability. When considering a large number of qubits, this non-zero probability produces a measurable error rate.

In the past decade, several demonstrations of QC apparatuses have been implemented using photons as the qubits and optical fibers as the quantum channel. For these implementations to be of practical use, it is important that they are simple and allow, if possible, high rate key exchange, in spite of current technological limitations. This consideration influences the choice of the QC apparatus and of the set of quantum states in which the qubits are prepared. In spite of the fact that polarization states of the electromagnetic field represent natural candidates for the implementation of QC, they are difficult to use in practice when optical fibers carry the qubits. Optical fibers indeed usually induce polarization state transformations. On the contrary, timing information is extremely stable and it can be used to implement simple QC apparatuses. Debuisschert et al. have proposed in Physical Review A 70, 042306 (2004), the content of which is incorporated herein by reference thereto, a family of time coding protocols. In the simplest of these protocols, the emitter sends for each bit a single-photon pulse. One of the bit values, say "0", is coded by an undelayed pulse, while "1" is coded by a delayed pulse. The value of the delay is smaller than the pulse duration. The receiver measures the time of arrival of the photons with respect to a time reference and defines three sets of events. The first one contains detections that can only come from undelayed pulses and are counted as "0" value bits. The second set contains detections that can only come from delayed pulses and are counted as "1" value bits. Finally, the third sets contains detections that can come from both the undelayed and the delayed pulses. They correspond to inconclusive results and are discarded. The receiver also sometimes sends the pulses into an interferometer to interferometrically measure their duration. The security of this protocol comes from the fact that whenever the eavesdropper obtains an inconclusive result, he must guess what state to forward to the receiver and has a non-zero probability of introducing errors. The interferometric measurement of the pulse duration prevents the eavesdropper from sending pulses much shorter than the original one to force the measurement result of the receiver. Using two additional delayed pulses carrying no information imposes supplementary symmetry constraints on the eavesdropper, which prevents him from exploiting quantum channel attenuation.

While the original QC proposal called for the use of single photons as qubits to encode the key, their generation is difficult and good single-photon sources do not exist yet. Instead, most implementations have relied, because of simplicity considerations, on the exchange between the emitter and the receiver of weak coherent states, as approximations to the ideal qubits. A coherent state consists of a coherent superposition of photon states. In other words, a fixed phase relationship exists between the different photon state components inside a coherent state. In order to describe such a state, it is sufficient to know its amplitude and global phase. A coherent state is said to be weak when its amplitude is small. Weak coherent states can be produced by attenuating laser pulses.

The fact that weak coherent states are used in practical implementations, instead of single photons, means that the eavesdropper can perform a very powerful attack, known as the Photon Number Splitting (PNS) attack. The eavesdropper performs a quantum non-demolition measurement to measure the number of photons present in each weak pulse. When a pulse contains exactly one photon, the eavesdropper blocks it. When a pulse contains two photons, the eavesdropper takes one photon and stores it in a quantum memory, while forwarding the other photon to the receiver. The eavesdropper finally measures the quantum states of the photons he has stored after the basis reconciliation step of the protocol. At this stage, the eavesdropper knows which measurement he must perform to obtain full information on the quantum state that had been sent by the emitter. In order to hide his presence, which could be revealed by a reduction of the detection rate of the receiver because of the blocked fraction of the pulses, the eavesdropper can make use of a perfect lossless channel—remember that in QC the eavesdropper is limited by physics but not technology—to forward to the receiver the multi-photon pulses from which he removed one photon. The PNS attack is particularly powerful in the real world, where the receiver expects to detect only a small fraction of the photons, because of quantum channel attenuation and limited detector efficiency. It is thus important to devise QC apparatuses and protocols that are resistant to these attacks.

Several approaches have been proposed to reduce the possibility for the eavesdropper to perform PNS attacks. Hwang W. Y. in Physical Review Letters 91, 057901 (2003), Wang X. B. in Physical Review Letters 94, 230503 (2005) and Lo H. K. et al. in Physical Review Letters 94, 230504 (2005), the contents of which are incorporated herein by reference thereto, have proposed to use Decoy states. Novel protocols resilient to PNS attacks have also been proposed. In H. Takesue et al, entitled "Differential phase shift quantum key distribution experiment over 105 km fibre", quant-ph/0507110, the content of which is incorporated herein by reference thereto. Takesue et al. presented such a protocol using a binary (0, π) phase difference between two adjacent weak coherent states of duration t and separated by a time T in an infinite stream, with t smaller than T, to code the bit values. In this stream, adjacent weak coherent states are said to be phase coherent. The receiver performs an interferometric measurement to determine this differential phase and hence establish the bit value. The security of this protocol comes from the fact that the two quantum states corresponding to each differential phase value are non-orthogonal. An eavesdropper trying to measure bit values sometime obtains inconclusive results. In these cases, he has to guess which state to forward and introduces errors with non-zero probability. If he elects instead not to forward anything to the receiver when he obtains an inconclusive results, he suppresses interference for the adjacent weak coherent state, which causes errors with non-zero probability. In this protocol, PNS attacks on individual weak coherent states are obviously useless as the bit value is coded in the phase difference between adjacent states. An effective PNS attack would have to measure the number of photons in two adjacent weak coherent states. This would however destroy the phase coherence with the other neighboring states and introduce errors with a non-zero probability.

SUMMARY OF THE INVENTION

An apparatus and method are provided for exchanging between an emitter and a receiver a sequence of bits, also known as the raw key and allowing the emitter and the receiver to estimate the maximum amount of information an eavesdropper can have obtained on the raw key. This raw key can subsequently be distilled into a secure key through an appropriate key distillation procedure.

The method comprises several steps. In a first step, the method, via an emitter, sends a stream of qubits, generated by a qubit source, two adjacent qubits in the stream having a fixed phase relationship and wherein each of the qubits is prepared in one of two quantum states, wherein the quantum states are not orthogonal. In a second step, the method performs, via the receiver, a first type of measurement, a positive operator value measurement, on some of the qubits to try to determine in which of the quantum states they were prepared by the emitter. In a third step, the method, via the receiver, performs a second type of measurement on pairs of qubits to estimate the degree of coherence of the phase relationship existing between them. In a fourth step, the method, via the receiver, announces which qubits yielded conclusive results of the positive operator value measurement, so that they can contribute to the raw key. In a sixth step, the method, via communication over a conventional channel and collaboration between the emitter and the receiver, assesses the degree of coherence between the qubits of the stream to estimate the amount of information of an eavesdropper on the raw key.

The first advantage of this quantum cryptography apparatus and method is that they are simple to implement. This simplicity stems from the fact that the qubits need to be prepared in only two non-orthogonal states. In addition, the apparatus and method allows the use of time coding of the values of the qubits. One of the bit values is coded by preparing a qubit consisting of a non-empty weak coherent state in a first of two time bins, while keeping the second time bin empty, with each time bin being shorter than the time between them. The other bit values is coded on a qubit where the empty and non-empty time bins are swapped. In addition, two qubits sent by the emitter must have a fixed phase relationship (they must be phase coherent). In this case, one of the optimal positive operator value measurement allowing to distinguish between the two states involves measuring the time of arrival of a photon with a photon counting detector. This measurement is extremely simple to perform. These states are moreover extremely robust against environmental perturbation in the quantum channel. Polarization fluctuations for example do not induce errors. Finally, this simplicity also means that high rate key exchange is possible, even with existing technology. Eavesdropping is monitored by an interferometric evaluation of the phase coherence between two time bins of two qubits by the receiver.

The second advantage of this quantum cryptography apparatus and method is that they are robust against PNS attacks. This attribute stems from the fact that removal of qubits by an eavesdropper results in a noticeable perturbation. If one of the qubits is removed and the receiver tries to measure the coherence of this particular qubit with another one, the measurement outcome will indicate this removal with a non-zero probability.

Other objects and advantages of the present invention will become apparent from the following description, taken in connection with the accompanying drawings, wherein, by way of illustration and example, an embodiment of the present invention is disclosed.

DETAILED DESCRIPTION OF THE PREFERRED EMBODIMENTS

Figure 1:
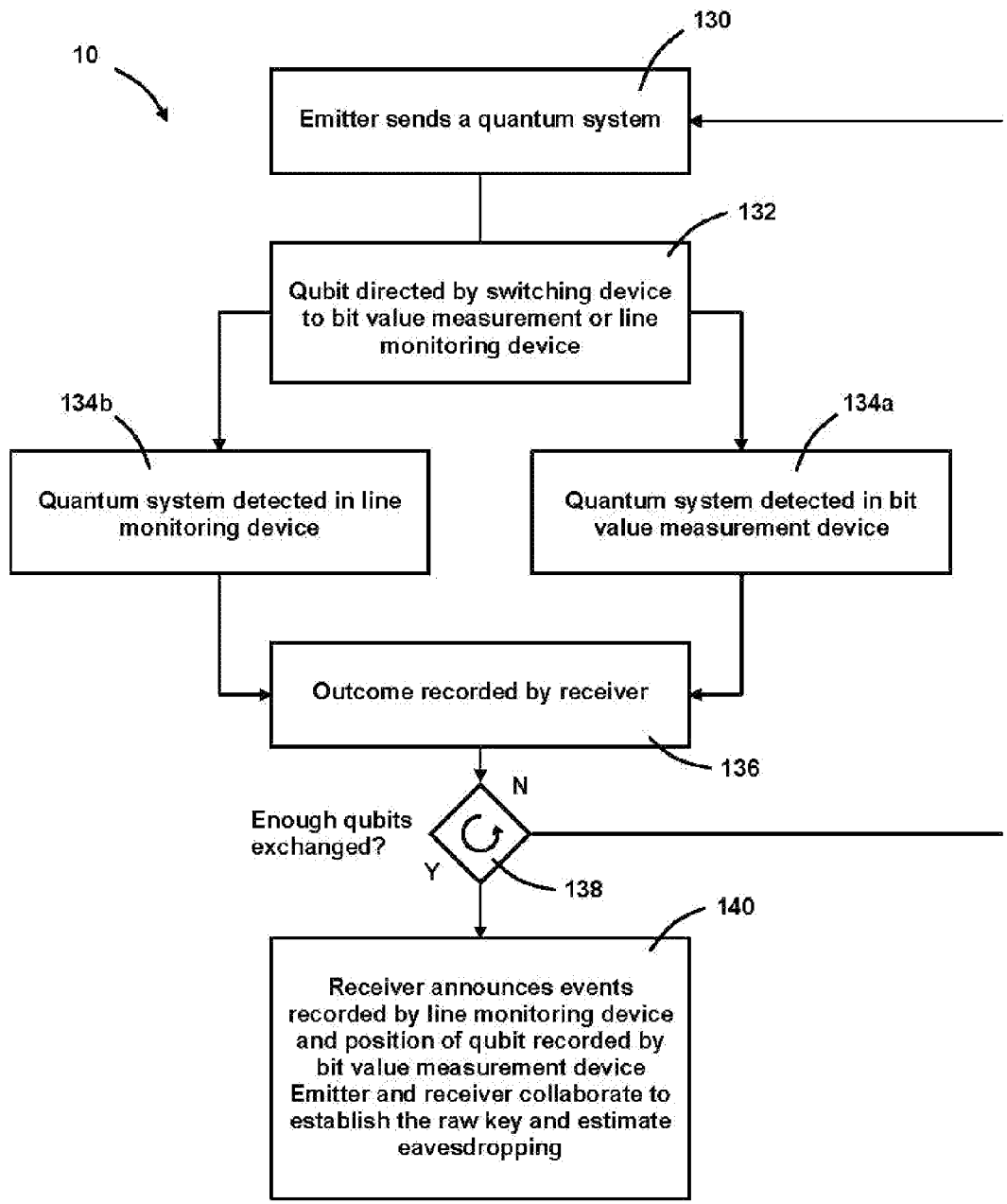
FIG. 1 is a high-level flow chart of the key distribution procedure.
Figure 2:
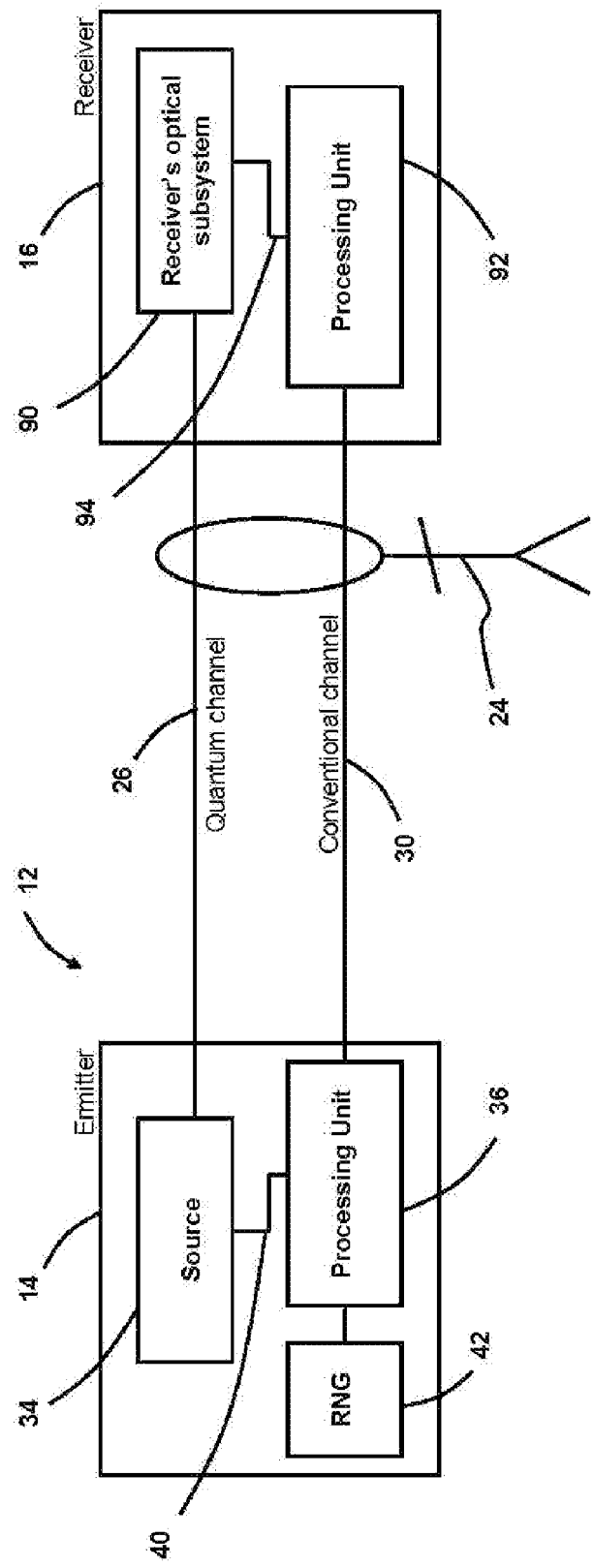
FIG. 2 is a schematic diagram of the apparatus of the invention.
Figure 3:
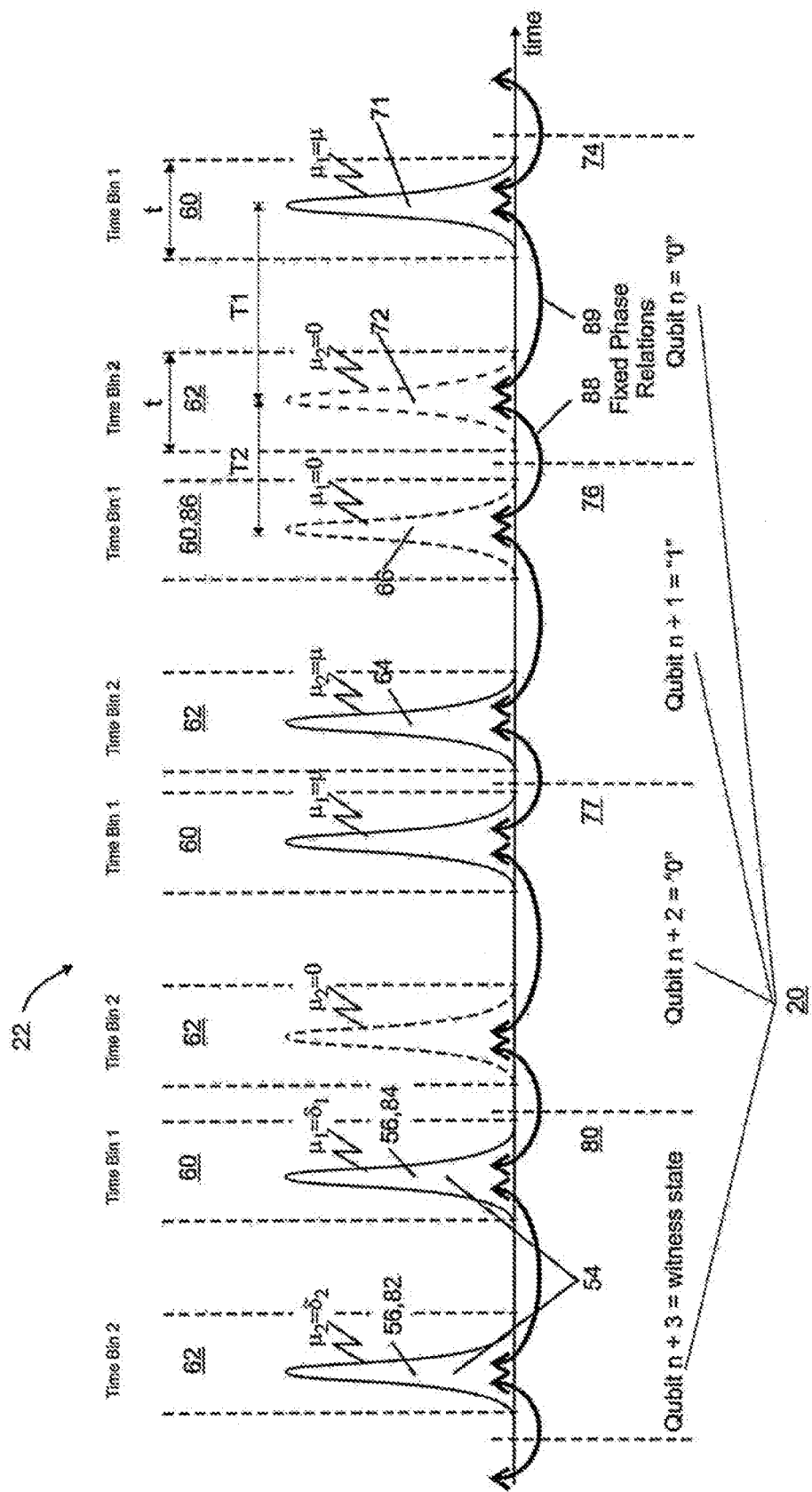
FIG. 3 is a graphical representation of a stream of qubits produced by the emitter.

Referring now to FIGS. 1 and 2, a method 10 and apparatus 12 are provided for exchanging between an emitter station 14 and a receiver station 16 a sequence of symbols coded on a stream 22 of quantum systems (i.e., qubits) 20, shown in FIG. 3, used to transmit the raw key (a data string such as 10110010100111001001010 . . . 01010100) and allowing the emitter station and the receiver station to estimate the maximum amount of information an eavesdropper 24 can have obtained on the raw key. This raw key can subsequently be distilled into a secure key (a distilled data string such as 10011000 . . . 1100 of fewer digits than the raw data string) through an appropriate key distillation procedure, known in the art.

The emitter station 14 and the receiver station 16 are connected by a quantum channel 26 and a conventional channel 30. The values of the symbols are encoded by preparing quantum systems in a particular quantum state, also known as a data state. The quantum systems exchanged between the emitter station 14 and the receiver station 16 are called below qubits, no matter what the size of the alphabet of symbol used is.

The quantum states used are not orthogonal. This means that, according to the laws of quantum physics, it is not possible for a party ignoring in which state a qubit is prepared to determine it with 100% probability. The best one can do is to perform a generalized measurement, which gives a conclusive result with probability p<1 and an inconclusive result with probability 1−p. The receiver station 16 will thus only be able to determine a fraction of the states—and so also of the symbols—sent by the emitter station 14. This is also true for an eavesdropper 24. When obtaining an inconclusive result, an eavesdropper 24 will have the choice either to guess which state to send or not to send anything.

If the eavesdropper 24 guesses the state he sends, he will introduce errors with non-zero probability in the sequence of symbols 20 produced by measuring the qubits 20 of the stream 22. The emitter station 14 and the receiver station 16 can subsequently collaborate during a so-called key distillation phase to detect these errors. If the eavesdropper 24 just chooses not to send anything in place of inconclusive results, the situation becomes more difficult. It is indeed not possible to distinguish these cases from qubits absorption by a lossy quantum channel 26. It is thus necessary to add a mechanism allowing the emitter and the receiver stations 14 and 16 to notice this kind of attack. To achieve this, the emitter station 14 ensures that a coherent phase relationship exists between two qubits 20 of the stream 22 and located sufficiently close in the stream 22 of qubits. The receiver will then sometime verify that the coherent phase relationship still exists between two randomly selected quantum systems, by performing an appropriate measurement (interferometric measurement for example). The removal of a qubit 20 or the destruction of the phase relationship will yield a noticeable perturbation with non-zero probability.

Unfortunately, the eavesdropper 24 still has another possibility. He can perform a coherent measurement of the quantum property used to code the symbol value across the separation between two qubits. With such an attack, he would not break the coherence between qubits, and thus not trigger an alarm, while obtaining almost full information. It is thus necessary to add a mechanism allowing the emitter and the receiver stations 14 and 16 to notice this kind of attack. To achieve this, the emitter station 14 inserts between some of the qubits prepared in a data state a quantum system prepared in a state, also known as a witness state, which is not orthogonal to the data states and which is not a superposition of these states. These quantum systems prepared in a witness state will also be referred to as qubits below. There exists then at least one measurement allowing, when performed on a witness state to determine whether this state has been subjected to a measurement, which, when applied to a qubit 20 prepared in a data state, allows to determine what this data state is. The receiver station 16 can then randomly perform this measurement on some qubits 20. Some of these qubits 20 will be prepared in the witness state and will thus allow the identification of an attack across the qubit separation.

In summary, the method 10 and apparatus 12 of the invention is based on three principles: first, the use of qubits 20 prepared in non-orthogonal states and featuring a coherent phase relationship with neighbors; second, the verification on some pairs of qubits that the coherent phase relationship still exists; and third, the use of qubits prepared in a so called witness states which help reveal attacks performed across the quantum system separation. An embodiment of the method 10 and apparatus 12 of the invention using time coding of the symbol values and using pulsed weak coherent states of the electromagnetic field in time bins is presented below.

Referring to FIG. 2, one embodiment of the apparatus 12 includes an emitter station 14 and a receiver station 16 connected by the quantum channel 26 and the conventional channel 30. The quantum channel 26 can, for example, be a dedicated optical fiber or a channel in a wavelength division multiplexing optical communication system. The conventional communication channel 30 can for example be the internet or a second optical fiber carrying bright optical pulses.

The emitter station 14 comprises a qubit source 34 controlled by a processing unit 36. The processing unit 36 can for example be a computer having a memory, input/output ports, a central processor managing inputs, memory and operating on such to produce desired outputs, as well as a data transmission and communications mechanism permitting communications with other components of the apparatus. The quantum system source 34 is connected to the processing unit 36 by a transmission line 40. This transmission line 40 can for example be made up of wires or cables carrying electronic signals. A random number generator 42 is connected to the processing unit 36.

Figure 4:
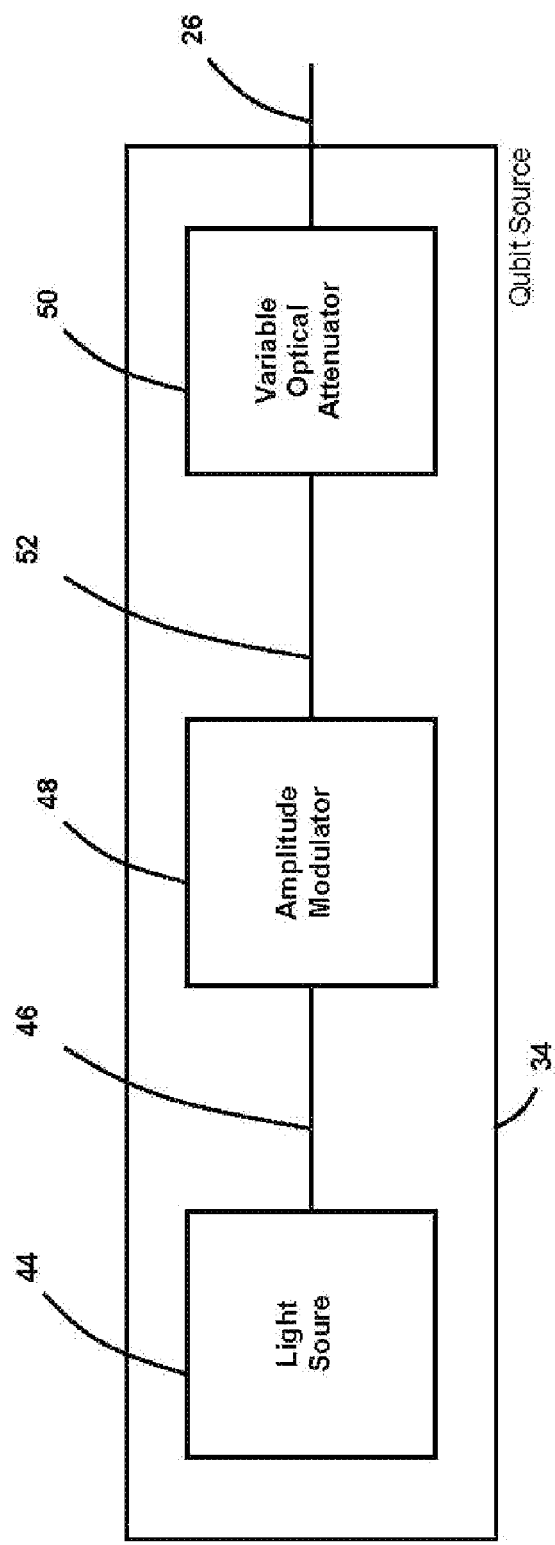
FIG. 4 is a schematic diagram of an embodiment of the source of the emitter.

Referring now to FIG. 4, the qubit source 34 includes a source of light 44 connected by an optical path 46 to an amplitude modulator 48. The source of light 44 can be made up for example of a mode-locked laser or a continuous wave laser. The source 34 can also include a variable optical attenuator 50 connected to the amplitude modulator 46 by an optical path 52, to adjust the overall amplitude of the qubits 20. Optical paths 46 and 52 can comprise for example optical fibers or free space optics paths. The output of the qubit source 34 is connected to the quantum channel 26 in such a way that the emitted light is launched into the quantum channel.

Referring again to FIG. 3, this source 34 produces a stream 22 of qubits 20. Each qubit 20 is made up of a pair 54 of pulsed weak coherent states 56 of the electromagnetic field, such as attenuated laser pulses, in time bins 60 and 62 of duration t. In a given qubit 20, the center of the time bins 60 and 62 are separated by a time T1, with t being smaller than T1. The center of the second pulsed weak coherent state 72 of a qubit 20 is separated from the center of the first pulsed weak coherent state 66 of the following qubit 20 by a time T2, with t being smaller than T2. In principle, T1 need not to be equal to T2. For the sake of simplicity, we will nevertheless consider below that T1=T2=T. A qubit 74 carrying a "0" bit value consists of a non-empty weak coherent state 71, containing on average μ photons with μ selected to guarantee the security of the protocol, in the first time bin 60 and an empty (μ=0) weak coherent state 72 in the second time bin 62. Similarly, a qubit 76 carrying a "1" bit value consists of an empty (μ=0) weak coherent state 66 in the first time bin 60 of qubit 76 and a non-empty weak coherent state 64, containing on average μ photons with μ selected to guarantee the security of the protocol, in the second time bin 62 of qubit 76. Note that, in spite of the fact that FIG. 3 shows only the first time bin 60 and the second time bin 62 of qubit 74, each of the qubits of the stream 72 have a first time bin 60 and a second time bin 62.

Figure 5:
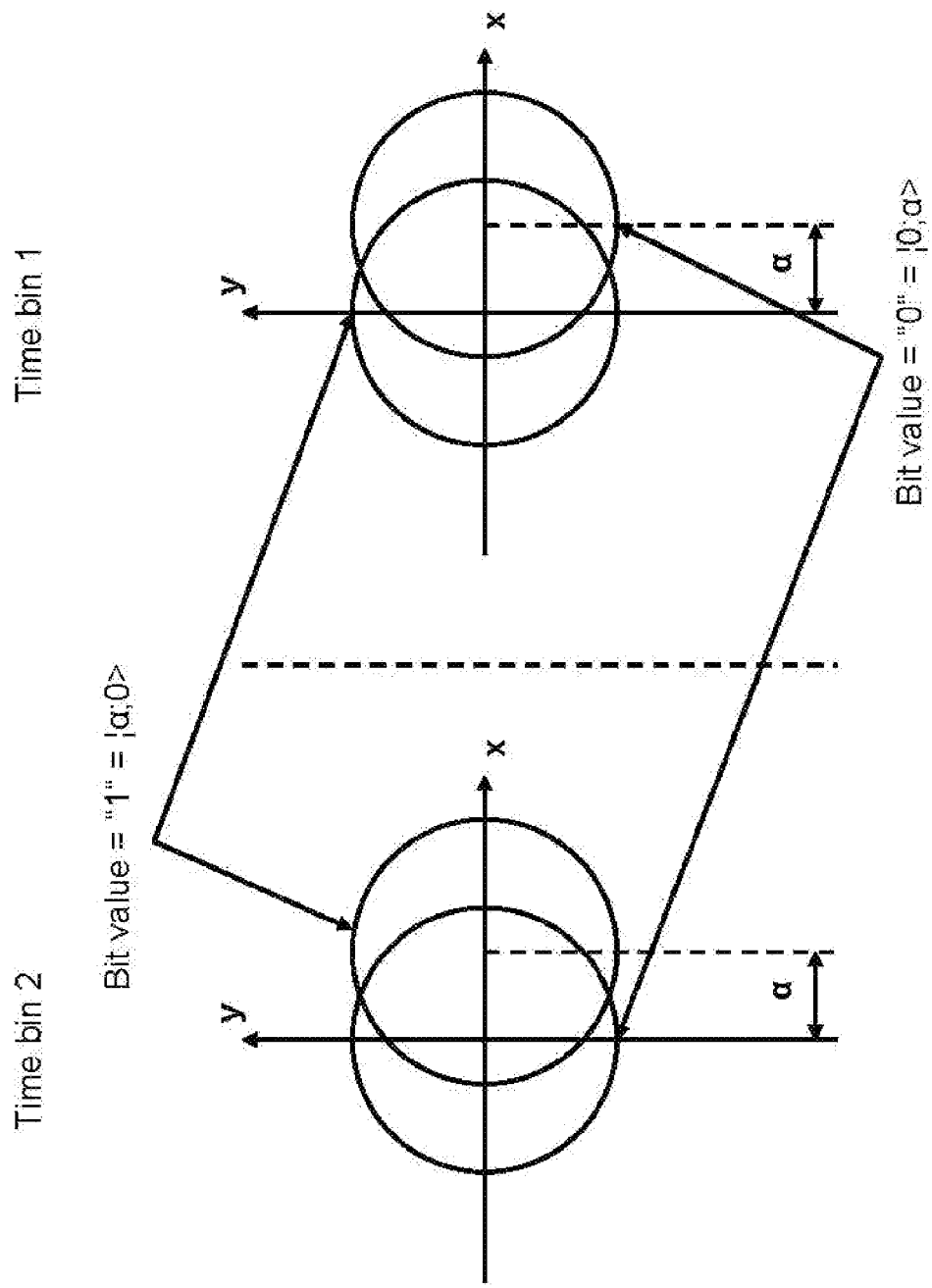
FIG. 5 is a diagram showing the two non-orthogonal states produced by the emitter in quadrature space.

Referring now to FIG. 5, where quadrature space is shown for the two time bins 60 and 62, the quantum states corresponding to each of the two values of the qubits 20 overlap and are thus non-orthogonal.

In a formal notation, a qubit q can be written $|q\rangle=|\beta;\alpha\rangle$. Each position in the second "ket" of the equation represents a mode. The states described above correspond to time coding. In this case, each mode is a non-overlapping time bin. The letters $\alpha$ and $\beta$ indicate the amplitude of the coherent state in each of the time bins. In this notation, one can calculate the average number of photons in the first time by $|\alpha|^2$ and in the second one by $|\beta|^2$. A qubit value of 0 is thus noted $|0\rangle = |0;\alpha\rangle$ and of 1, $|1\rangle = |\alpha;0\rangle$, where the average number of photons µ in the non-empty weak coherent state is equal to $|\alpha|^2$.

The qubit source 34 can also produce a sequence $|d\rangle = \delta_2; \delta_1\rangle$, known as a witness state 80. It consists of non-empty weak coherent states 82 and 84 with an average number of photons of $|\delta_1|^2$ and $|\delta_2|^2$ in the first and second time bin respectively. Decoy sequences 80 do not code for a bit value, but are used to prevent certain eavesdropping attacks.

An important property of the source 34 is that two adjacent weak coherent states, whether in the two time bins 60 or 62 of a particular qubit 20 or time bins 62 or 86 of neighboring qubits, must have a fixed phase relationship. Equivalently, one can say that adjacent weak coherent states in the stream 22 must be phase coherent. Arrows 88 and 89 show the fixed phase relationships between adjacent weak coherent states, e.g., 66 and 72 or 71 and 72. This implies that two such weak coherent states coherently interfere if superposed. A stream 22 of pulsed weak coherent states exhibiting such a phase coherence can be produced by carving out pulses out of a continuous wave laser beam with the amplitude modulator 48. Pulses produced by a mode-locked laser also exhibit this property.

For each qubit 20 of the stream 22, the processing unit 36 of the emitter station 14 uses a random number provided by the random number generator 42 to select whether a "0"-qubit, a "1"-qubit or a witness state 80 should be sent on the quantum channel 26. For each qubit 20, the processing unit 36 records the selection. The respective probabilities for each possibility do not necessarily have to be equal. They are selected to maximize key exchange rate.

Referring now to FIG. 2, the receiver 16 includes an optical subsystem 90 and a processing unit 92. The processing unit 92 can for example be a computer having a memory, input/output ports, a central processor managing inputs, memory and operating on such to produce desired outputs, as well as a data transmission and communications mechanism permitting communications with other components of the apparatus. The optical subsystem 90 is connected to the processing unit 92 by a transmission line 94. This transmission line 94 can for example include wires or cables carrying electronic signals.

Figure 6:
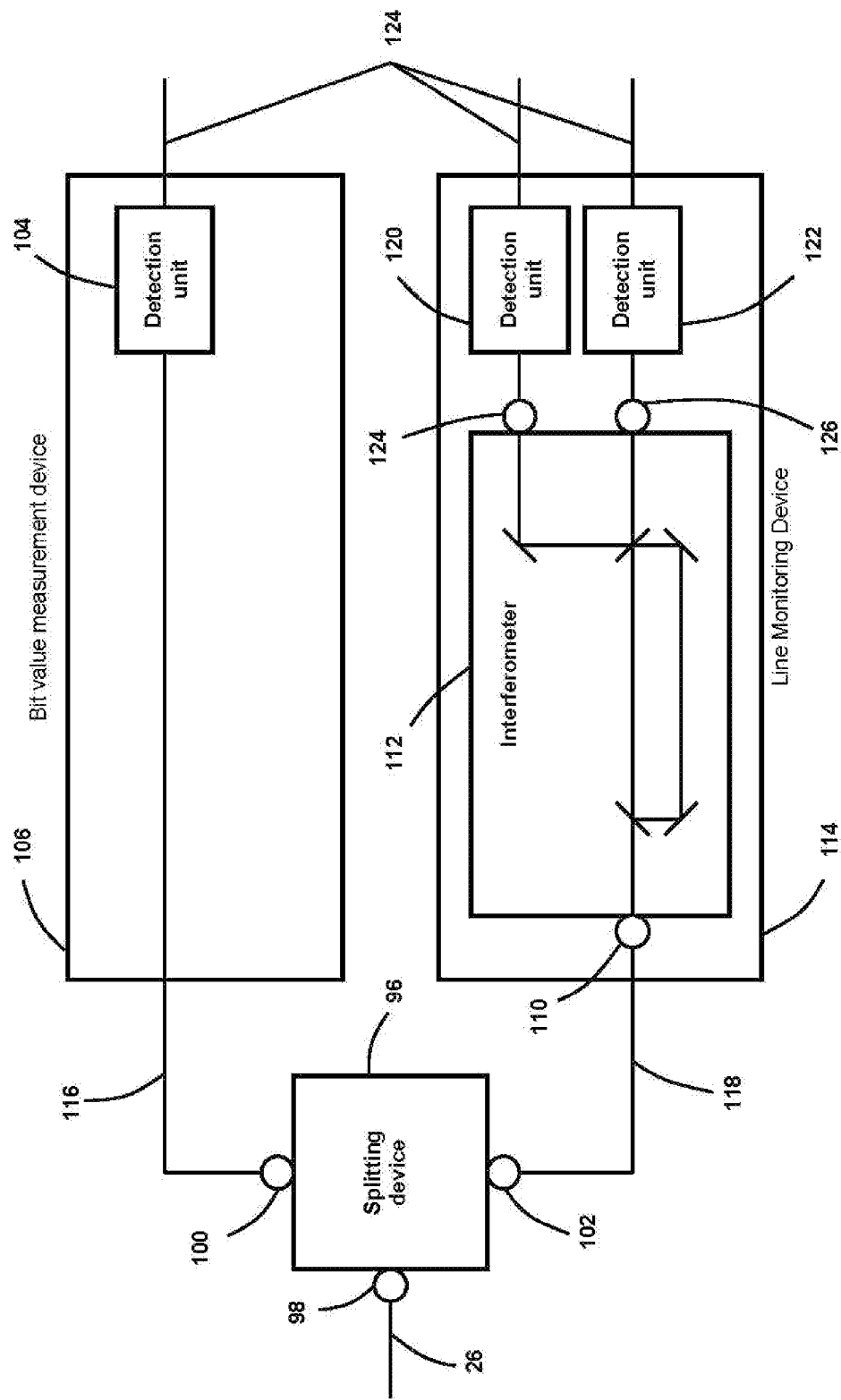
FIG. 6 is a schematic diagram of the optical subsystem of the receiver.

Referring now to FIG. 6, the optical subsystem 90 has a switching device 96 with at least one input port 98 and at least two output ports 100 and 102. This device 96 can for example be a coupler with appropriate reflection/transmission ratio. It can also be an optical switch randomly triggered by the processing unit 92. The input port 98 of the switching device 96 is connected to the quantum channel 26. Its first output port 100 is connected to a detector unit 104 of a bit value measurement device 106, which is used to perform a measurement in the time basis. The second output port 102 is connected to the input port 110 of an imbalanced interferometer 112 of a line monitoring device 114. The switching device 96 serves to direct the incoming qubits 20 either to the bit value measurement device 106 or to the line monitoring device 114 using optical paths 116 and 118. Optical paths 116 and 118 can comprise for example optical fibers or free space optics paths. The interferometer 112 can for example be an imbalanced Mach-Zehnder interferometer inducing a time delay of T. It serves to superpose adjacent weak coherent states, either from a single qubit (71 and 72) or from two adjacent qubits (66 and 72). When the superposed states 71 and 72 come from the two time bins 60 and 62 of a single qubit 74, one speaks of an internal superposition, which serves to verify the intra-qubit coherence. When they come from adjacent qubits, e.g. 66 and 72, one speaks of a cross-superposition, which serves to verify the inter-qubit coherence. Two detector units 120 and 122 are connected to the output ports 124 and 126 of the interferometer 112. The imbalance of this interferometer 112 is adjusted to produce destructive interference in one of the output port 124 or 126 connected to one detector unit 120 or 122, say for example detector unit 122, when a non-empty weak coherent state is present in two adjacent pulses. This is the case for witness state 80 (because of internal superposition) and in the case of a "1"-qubit followed by a "0"-qubit (because of cross-superposition). Detector units 104, 120 and 122 are made up of for example of photon-counting detectors with a timing resolution smaller than T, sufficient to allow them to discriminate between the two time bins e.g., 60 or 62 of the quantum states 20 produced by the source 34. These photon-counting detectors 104, 120 and 122 can for example include avalanche photodiodes in Geiger mode or devices exploiting a non-linear process to upconvert the incoming signal. The detector units 104, 120 and 122 are connected to the processing unit 92 by the transmission lines 124. These transmission lines 124 can for example be made up wires or cables carrying electronic signals.

The bit value measurement 106 includes the detector unit 104 allowing distinction between the arrival of one photon in the first time bin 60 or the second one 62. This essentially amounts to performing a positive operator value measurement to distinguish between non-orthogonal states. As the average number of photons per qubit 20 is low, the bit value measurement device 106 sometimes fails to record a detection in either of the time bins 60 or 62. When this happens, the measurement is inconclusive. When the detector unit 104 registers a detection, it is recorded by the processing unit 92.

The line monitoring device 114 enables monitoring of the degree of phase coherence between adjacent weak coherent states 66 and 72 in adjacent time bins 60 or 62 of two different qubits 74 or 76 (inter-qubit coherence) or inside a witness state 80 (intra-qubit coherence). The two weak coherent states are superposed by the interferometer 112 and interferences recorded.

Figure 7:
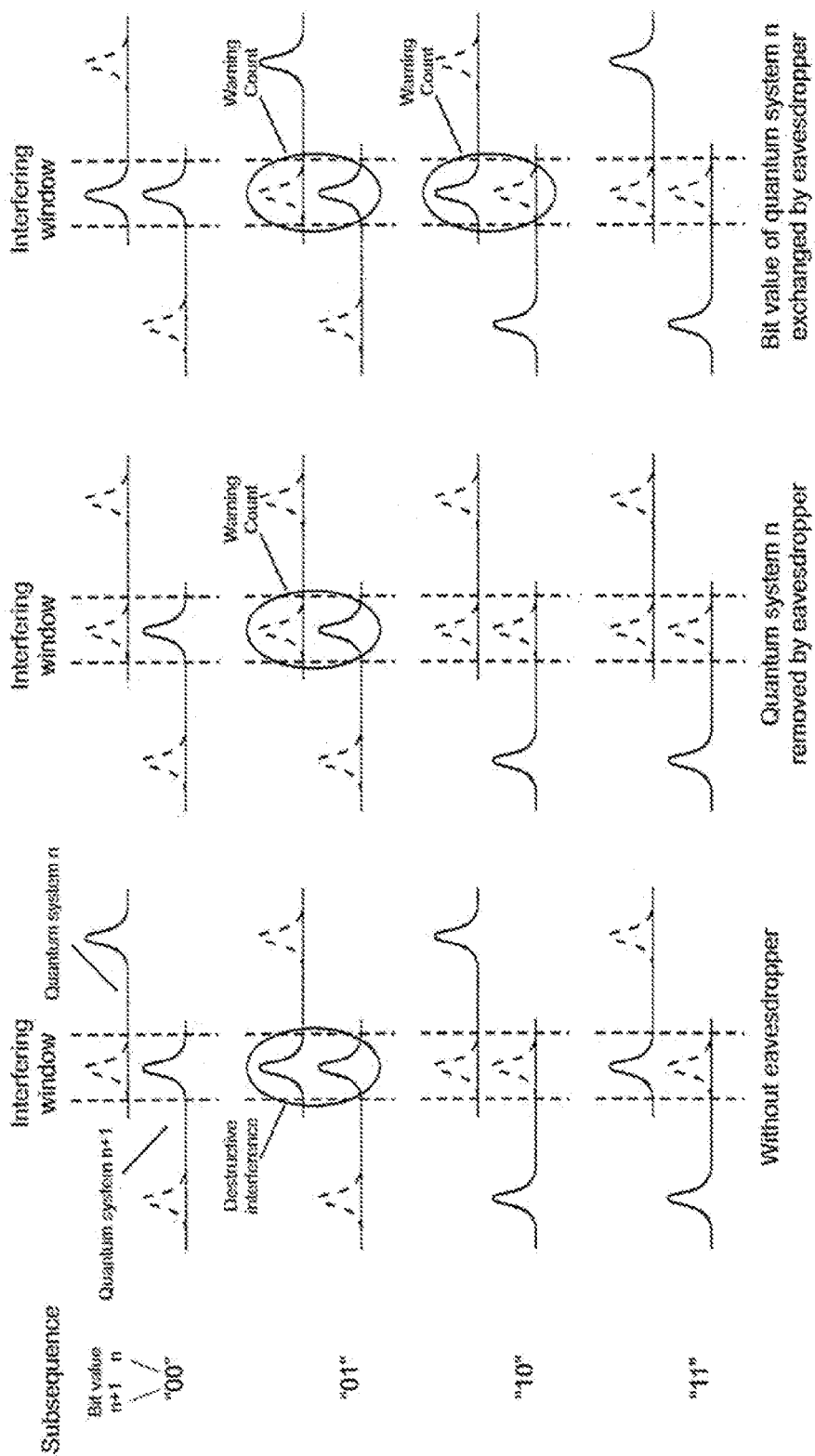
FIG. 7 is a graphical representation showing the quantum systems in one of the output ports of the interferometer of the receiver's optical subsystem and the effect of the removal and of the exchange of the value of one of these quantum systems by an eavesdropper.

Referring now to FIG. 7, the left column, one can see that if the subsequence of qubit values n and n+1 is "11" or "00", the probability of recording a count in the interference time window is non-zero for both detector units 122 and 120. As a non-empty weak coherent state is superposed with an empty one, no interference occurs and the photon probabilistically chooses the output port 124 or 126 of the interferometer 112. If the subsequence is "10", then the detector units 122 and 120 should not record counts in the interference window, because the two contributions are empty. Finally, if the subsequence is "01", detector unit 122 should not record a count either, because of destructive interference, while detector unit 120 has a non-zero probability of registering a count.

Looking now at the center column, one can see that, in the case of a "01" sequence and if the eavesdropper removes one of the qubits, it destroys interference. Detector unit 122 then records a count in the interference time window with a non-zero probability. These counts are referred to below as the warning counts. This implies that an eavesdropper 24 that would remove certain of the qubits 20, for example when he obtains an inconclusive result, would induce a noticeable perturbation. Obviously, if the eavesdropper 24 blocks all the qubits 20 in order to prevent the occurrence of these non-interfering events, he interrupts the communication, which will be noticed by the emitter and receiver.

Looking to the right column, one sees that the swap of one qubit value will similarly induce counts in the interference time window, where none are expected. An eavesdropper 24, who would randomly guess unknown qubits values, would choose the wrong value with 50% probability. In these cases, he would have a non-zero probability of introducing warning counts. Note that such an intervention by the eavesdropper 24 would also induce errors with non-zero probability in the sequence detected in the bit value measurement device 106.

Finally, a quantum non-demolition measurement across two weak coherent states, eg. 71 and 72 belonging to a single qubit, e.g. 74 destroys the phase coherence with adjacent weak coherent states and will thus induce warning counts with non-zero probability, when one weak coherent state of the attacked qubit is superposed with a weak coherent state of a neighboring qubit. Similarly, a quantum non-demolition measurement on two weak coherent states, e.g., 66 and 72 belonging to two different qubits 76 and 74 destroys the phase coherence of both of these weak coherent states with the second weak coherent state of their respective qubits. Warning counts are thus also induced when such an attack is performed on a witness state. If a quantum non-demolition attack covers more than two weak coherent states, phase coherence will similarly be destroyed and warning counts induced. Detections of detector units 120 and 122 are recorded by the processing unit 92.

After the exchange of a large number of qubits 20, the receiver station 16 publicly announces over the conventional channel 30 in which cases he obtained a conclusive result in his bit value measurement device 106. The emitter station 14 verifies and announces to the receiver station 16 which cases correspond to witness states 80 and which do not. Cases corresponding to witness states are disregarded, as they do not code for a symbol value. The other cases are added to the raw key. The receiver station 16 also announces to the emitter station 14 over the conventional channel 30 in which cases he recorded detections in the detection units 120 and 122 of the line monitoring device 114. The emitter station 14 checks in the list of sent qubits 20 whether these detections were expected or whether they were not. The occurrence probability of warning counts allow the emitter station 14 and the receiver station 16 to deduce the intensity of the eavesdropping performed and thus the amount of information an eavesdropper 24 can have obtained on the key. This estimate allows them to adequately parametrize the steps of the procedure of key distillation including, for example, error correction and privacy amplification, which produces the secure final key from the raw key.

In another embodiment of the apparatus 12, the emitter station 14 of the apparatus 12 is provided separately but for use with the receiver station 16 and vice-versa.

Referring again to FIG. 1, the key exchange method 10 of the invention includes the following steps.

In a first step 130, the emitter station 14 uses its qubit source 34 to produce a qubit 20 and send it through a quantum channel 26 to the receiver station 16.

In a second step 132, the qubit 20 passes through the switching device 96 (shown in FIG. 6), where it is either directed to the bit value measurement device 106 or to the line monitoring device 114, wherein associated measurements are performed on each respective stream of qubits.

In a first alternative substep 134a, for the qubits 20 accordingly directed by the switching device 96 to the bit value measurement device 106, the time of arrival of the photons is measured.

In a second alternative substep 134b, the intra-qubit phase coherence of a qubit or the inter-qubit phase coherence between adjacent qubits of the qubits 20 accordingly directed by the switching device 96 to the line monitoring device 114 is interferometrically measured. The substeps 134a and 134b exclude each other.

In a fourth step 136, outcomes of the measurements are recorded by the processing unit 92 of the receiver station 16.

In a fifth step 138, the method 10 performs a loop, repeating the prior method steps 130, 132, 134a, 134b and 136 until a stream 22 of a sufficient number of qubits 20 has been exchanged.

In a sixth step 140, once a sufficient number of qubits 20 have been exchanged, the emitter station 14 and the receiver station 16 exchange relevant information to assess the intensity of eavesdropping during the exchange by estimating the degree of intra- and inter-qubit phase coherence from the outcome of the measurements of step 134b. The emitter station 14 and the receiver station 16 also collaborate to establish which of the measurements performed at step 134a yielded a bit of raw key.

A raw key as well as an estimate of the information that an eavesdropper can have obtained on this raw key constitute the products of the key exchange method 10.

In an advantage, this quantum cryptography apparatus 12 and method 10 is simple to implement. This simplicity stems from the fact that the qubits 20 need to be prepared in only two non-orthogonal states.

In another advantage, the apparatus 12 and method 10 allows the use of time coding of the values of the qubits 20. One of the bit values is coded by preparing a qubit, e.g., 74 consisting of a non-empty weak coherent state 71 in a first of two time bins 60, while keeping the second time bin 62 empty, with each time bin being shorter than the time between them. The other bit values are coded on a qubit, e.g., 76 where the empty and non-empty time bins are swapped. In this case, one of the optimal positive operator value measurements allowing one to distinguish between the two states involves measuring the time of arrival of a photon with a photon counting detector. This measurement is extremely simple to perform.

In another advantage, the states used are moreover extremely robust against environmental perturbation in the quantum channel 26. Polarization fluctuations for example do not induce errors.

In another advantage, the simplicity of the invention means that high rate key exchange is possible, even with existing technology.

In still another advantage of this quantum cryptography apparatus 12 and method 10 is that they are robust against eavesdropping, which is monitored by an interferometric evaluation of the phase coherence between two time bins e.g., 60 and 62 inside some qubit, e.g. 74, and two time bins e.g., 86 and 62 between some pairs of qubits 76 and 74. In particular, this apparatus 12 and method 10 are very robust against PNS attacks. This attribute stems from the fact that removal of qubits 20 by an eavesdropper 24 results in a noticeable perturbation. If one of the qubits 20 is removed and the receiver station 16 tries to measure the coherence of this particular qubit with another one, the measurement outcome will indicate this removal with a non-zero probability.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. An apparatus for distributing a sequence of symbols between an emitter station and a receiver station connected by a quantum channel and a conventional channel, wherein the apparatus assesses the amount of information an eavesdropper having access to both of the channels can have obtained on the sequence, the apparatus comprising the emitter station having a control means so as to enable the emitter station to command and control its own components in cooperation with associated components of the receiver station and a quantum source for generating a stream of quantum systems,
   wherein the quantum systems have a coherent phase relationship between systems located in nearby positions of the stream,
   wherein some of the quantum systems are prepared in a quantum state belonging to a first set of quantum states, this set comprising at least two non-orthogonal quantum states, and the quantum states of this first set being associated with symbol values, and
wherein the emitter station is adapted to produce some of the quantum systems in a quantum state belonging to a second set of quantum states, this second set comprising at least one state, the states of this second set being non-orthogonal to some of the states of the first set, the states of this second set not being a superposition of some of the states of the first set, the states of this second set being selected in such a way that they are perturbed by a measurement adapted, when applied to a quantum system prepared in a state belonging to the first set, to determine at least in some cases in which state this quantum system was prepared wherein the quantum system source of the emitter station is adapted for;
   producing groups of at least two weak coherent states of the electromagnetic field each in a time bin of duration t, the center of each weak coherent slate being separated by a time T1 from the center of its closest neighbors, with T1 greater than t, the center of the last weak coherent state of one such group being separated from the center of the first weak coherent state of the next group by a time T2, with T2 greater than t, wherein any two weak coherent states in a group are phase coherent and a weak coherent state in a group is phase coherent with at least some of the weak coherent states of another nearby group;
   producing for each of the symbol of the sequence to be transmitted one quantum system comprising one such weak coherent state with non-zero amplitude in one of the time bins and weak coherent states with zero amplitude in the other time bins;
   inserting quantum systems with at least two weak coherent states with non zero amplitude in at least two time bins between some of the quantum systems associated with symbols; and
   sending the quantum systems to the receiver station through an appropriate quantum channel.

2. The apparatus of claim 1, wherein the quantum system source of the emitter station comprises a mode-locked laser connected by an appropriate optical path to an amplitude modulator.

3. The apparatus of claim 1, wherein the quantum system source of the emitter station comprises a continuous wave laser connected by an appropriate optical path to an amplitude modulator.

4. The apparatus of claim 1, wherein the source comprises a variable optical attenuator.

5. The apparatus of claim 1, wherein the switching device of the receiver station comprises an optical fiber coupler with a selected reflection / transmission ratio.

6. The apparatus of claim 1, wherein the switching device of the receiver station comprises a beam splitter with a selected reflection / transmission ratio.

7. The apparatus of claim 1, wherein the switching device of the receiver station comprises an optical switch.

8. The apparatus of claim 1, wherein the switching device of the receiver station is selected from a group of devices consisting of active and passive devices.

9. The apparatus of claim 1, wherein the receiver station comprises a detector unit connected by an appropriate optical path to the switching device and electrically connected to the control means, this detector unit allowing determination of time of arrival of a photon with a resolution smaller than T1 and smaller than T2, and thereby being adapted for determining in at least some cases in which quantum state a quantum system had been prepared by the emitter station.

10. The apparatus of claim 9, wherein the detector unit comprises an avalanche photodiode operated in Geiger mode.

11. The apparatus of claim 9, wherein the detector unit comprises an optical frequency upconversion device connected by an appropriate optical path to a second detector unit.

12. The apparatus of claim 1, wherein the receiver station comprises an optical device connected by an appropriate optical path to the switching device, and adapted for optically superposing at least two weak coherent states of different time bins in such a way that they destructively interfere if they are phase coherent, and directing the superposed states to at least one detector unit allowing determination of the time of arrival of a photon with a resolution smaller than T1 and smaller than T2.

13. The apparatus of claim 12, wherein the optical device comprises an interferometer.

14. The apparatus of claim 13, wherein the interferometer is a Mach-Zehnder interferometer.

15. The apparatus of claim 13, wherein the interferometer is an auto-compensated interferometer with at least one Faraday mirror, 16. The apparatus of claim 12, wherein the detector unit or the detector units comprise an avalanche photodiode operated in Geiger mode.

17. The apparatus of claim 12, wherein the detector unit or the detector units comprise an optical frequency upconversion device connected by an appropriate optical path to a second detector unit.

18. A receiver station for cooperating with an emitter station for distributing a sequence of symbols between the emitter station and the receiver station when interconnected by a quantum channel and a conventional channel, and assessing the amount of information an eavesdropper having access to both of the channels can have obtained on the sequence, the receiver station comprising;
   control means for controlling operation of the receiver station and coordinating operations and communications with the emitter station, so as to enable the receiver station to command and control its own components in cooperation with associated components of the emitter station having a quantum source for generating a stream of quantum systems, the quantum systems having a coherent phase relationship between systems located in nearby positions of the stream, and, when carrying a symbol of the sequence, being prepared in a state selected in a first set, this set comprising at least two non-orthogonal stales;

a switching device adapted for directing the quantum systems to one of at least two measurement subsystems;

a first measurement subsystem connected by an appropriate optical path to the switching device, and adapted for performing a first measurement on some of the quantum systems, this measurement allowing determination in sonic cases in which of the quantum states the quantum systems were prepared by the emitter station;

a measurement subsystem connected by an appropriate optical path to the switching device, and adapted for performing a second measurement On groups of at least two quantum systems, this measurement capable of obtaining information on the degree of coherence of the phase relationship existing between two quantum systems received by the receiver station;

a measurement subsystem connected by an appropriate optical path to the switching device, and adapted for performing a third measurement on quantum systems, this measurement allowing, when applied to quantum systems prepared in a state belonging to a second set of quantum states, this second set comprising at least one state, the states of this second set being non-orthogonal to some of the states of the first set, the states of this second set not being a superposition of some of the states of the first set, the states of this second set being selected in such a way that they are perturbed by a measurement adapted, when applied to a quantum system prepared in a state belonging to the first set, to determine at least in some cases in which state this quantum system was prepared; at least in some cases determination of whether they have been subjected, between the emitter and the receiver stations, to a measurement adapted, when applied to a quantum system prepared in a state belonging to the first set, to determining at least in some cases in which state this quantum system was prepared; and communication means enabling communication of data with the emitter station adapted for announcing to the emitter station the position in the stream of at least some of the quantum systems on which this first measurement yielded conclusive results, thereby allowing determination of which of the quantum states of the first set a particular quantum system had been prepared in and of which symbol had been sent by the emitter station, at least some of the measurement results of the second measurement and of the third measurement, the communications means further allowing the emitter station and the receiver station to collaborate to estimate the intensity of eavesdropping on the quantum channel, wherein the receiver station comprises a detector unit connected by an appropriate optical path to the switching device and electrically connected to the control means, this detector unit allowing determination of time of arrival of a photon with a resolution smaller than T1 and smaller than T2, and thereby being adapted for determining in at least some cases in which quantum state a quantum system had been prepared by the emitter station.

19. The receiver station of claim 18, wherein the detector unit comprises an avalanche photodiode operated in Geiger mode.

20. The receiver station of claim 18, wherein the detector unit comprises an optical frequency upconversion device connected by an appropriate optical path to a second detector unit.

21. A receiver station for cooperating with an emitter station for distributing a sequence of symbols between the emitter station and the receiver station when interconnected by a quantum channel and a conventional channel, and assessing the amount of information an eavesdropper having access to both of the channels can have obtained on the sequence, the receiver station comprising:

control means for controlling operation of the receiver station and coordinating operations and communications with the emitter station, so as to enable the receiver station to command and control its own components in cooperation with associated components of the emitter station having a quantum source for generating a stream of quantum systems, the quantum systems having a coherent phase relationship between systems located in nearby positions of the stream, and, when carrying a symbol of the sequence, being prepared in a state selected in a first set, this set comprising at least two non-orthogonal states;

a switching device adapted for directing the quantum systems to one of at least two measurement subsystems;

a first measurement subsystem connected by an appropriate optical path to the switching device, and adapted for performing a first measurement on some of the quantum systems, this measurement allowing determination in some cases in which of the quantum states the quantum systems were prepared by the emitter station;

a measurement subsystem connected by an appropriate optical path to the switching device, and adapted for performing a second measurement on groups of at least two quantum systems, this measurement capable of obtaining information on the degree of coherence of the phase relationship existing between two quantum systems received by the receiver station;

a measurement subsystem connected by an appropriate optical path to the switching device, and adapted for performing a third measurement on quantum systems, this measurement allowing, when applied to quantum systems prepared in a state belonging to a second set of quantum states, this second set comprising at least one state, the states of this second set being non-orthogonal to some of the states of the first set, the states of this second set not being a superposition of some of the states of the first set, the states of this second set being selected in such a way that they are perturbed by a measurement adapted, when applied to a quantum system prepared in a state belonging to the first set, to determine at least in some cases in which state this quantum system was prepared; at least in some cases determination of whether they have been subjected, between the emitter and the receiver stations, to a measurement adapted, when applied to a quantum system prepared in a state belonging to the first set, to determining at least in some cases in which state this quantum system was prepared; and communication means enabling communication of data with the emitter station adapted for announcing to the emitter station the position in the stream of at least some of the quantum systems on which this first measurement yielded conclusive results, thereby allowing determination of which of the quantum states of the first set a particular quantum system had been prepared in and of which symbol had been sent by the emitter station, at least some of the measurement results of the second measurement and of the third measurement, the communications means further allowing the emitter station and the receiver station to collaborate to estimate the intensity of eavesdropping on the quantum channel, wherein the receiver station comprises an optical device connected by an appropriate optical path to the switching device, and adapted for optically superposing at least two weak coherent states of different time bins in such a way that they destructively interfere if they are phase coherent, and directing the superposed states to at least one detector unit allowing determination of a time of arrival of a photon with a resolution smaller than T1 and smaller than T2.

22. The receiver station of claim 21, wherein the optical device comprises an interferometer.

23. The receiver station of claim 22, wherein the interferometer is a Mach-Zchnder interferometer.

24. The receiver station of claim 22, wherein the interferometer is an auto-compensated interferometer with at least one Faraday mirror.

25. The receiver station of one of claims 18 to 20, wherein the detector unit or the detector units comprise an avalanche photodiode operated in Geiger mode.

26. The receiver station of one of claims 18 to 20, wherein the detector unit or the detector units comprise an optical frequency upconversion device connected by an appropriate optical path to a second detector unit.

27. An apparatus comprising a receiver station and an emitter station, the receiver station cooperating with the emitter station for distributing a sequence of symbols between the emitter station and the receiver station when interconnected by a quantum channel and a conventional channel, and assessing the amount of information an eavesdropper having access to both of the channels can have obtained on the sequence, the receiver station comprising:

control means for controlling operation of the receiver station and coordinating operations and communications with the emitter station, so as to enable the receiver station to command and control its own components in cooperation with associated components of the emitter station having a quantum source for generating a stream of quantum systems, the quantum systems having a coherent phase relationship between systems located in nearby positions of the, stream, and, when carrying a symbol of the sequence, being prepared in a state selected in a first set, this set comprising at least two non-orthogonal states;

a switching device adapted for directing the quantum systems to one of at least two measurement subsystems;

a first measurement subsystem connected by an appropriate optical path to the switching device, and adapted for performing a first measurement on some of the quantum systems, this measurement allowing determination in some cases in which of the quantum states the quantum systems were prepared by the emitter station;

a measurement subsystem connected by an appropriate optical path to the switching device, and adapted for performing a second measurement on groups of at least two quantum systems, this measurement capable of obtaining information on the degree of coherence of the phase relationship existing between two quantum systems received by the receiver station;

a measurement subsystem connected by an appropriate optical path to the switching device, and adapted for performing a third measurement on quantum systems, this measurement allowing, when applied to quantum systems prepared in a state belonging to a second set of quantum states, this second set comprising at least one state, the states of this second set being non-orthogonal to some of the states of the first set, the states of this second set not being a superposition of some of the states of the first set, the states of this second set being selected in such a way that they arc perturbed by a measurement adapted, when applied to a quantum system prepared in a state belonging to the first set, to determine at least in some cases in which state this quantum system was prepared; at least in some cases determination of whether they have been subjected, between the emitter and the receiver stations, to a measurement adapted, when applied to a quantum system prepared in a state belonging to the first set, to determining at least in some cases in which state this quantum system was prepared; and communication means enabling communication of data with the emitter station adapted for announcing to the emitter station
the position in the stream of at least some of the quantum systems on which this first measurement yielded conclusive results, thereby allowing determination of which of the quantum states of the first set a particular quantum system had been prepared in and of which symbol had been sent by the emitter station, at least some of the measurement results of the second measurement and of the third measurement, the communications means further allowing the emitter station and the receiver station to collaborate to estimate the intensity of eavesdropping on the quantum channel, and the emitter station for cooperating with the receiver station, in order to distribute a sequence of symbols therebetween when interconnected by a quantum channel and a conventional channel, and assessing an amount of information an eavesdropper having access to both of the channels can have obtained on the sequence, the emitter station comprising:

a) control means so as to enable the emitter station to command and control its own components in cooperation with associated components of the receiver station; and b) a quantum source for generating a stream of quantum systems, the quantum systems having a coherent phase relationship between systems located in nearby positions of the stream,
wherein some of the quantum systems are prepared in a quantum state belonging to a first set of quantum states, this set comprising at least two non-orthogonal quantum states, and the quantum states of this first set being associated with symbol values, wherein the emitter station is adapted to produce some or the quantum systems in a quantum state belonging to a second set of quantum states, this second set comprising at least one state, the states of this second set being non-orthogonal to some of the states of the first set, the states of this second set not being a superposition of some of the states of the first set, the states of this second set being selected in such a way that they are perturbed by a measurement adapted, when applied to a quantum system prepared in a state belonging to the first set, to determine at least in some cases in which state this quantum system was prepared, wherein the quantum system source of the emitter station is adapted for:

producing groups of at least two weak coherent states of the electromagnetic field each in a time bin of duration t, the center of each weak coherent state being separated by a time T1 from the center of its closest neighbors, with T1 greater than t, the center of the last weak coherent state of one such set being separated from the center of the first weak coherent state of the next sct by a time T2, with T2 greater than t, wherein any two weak coherent states in a group are phase coherent and a weak coherent state in a group is phase coherent with any weak coherent state of another nearby group;

producing for each of the symbol of the sequence to be transmitted one quantum system comprising one such weak coherent state with non-zero amplitude in one of the time bins and weak coherent states with zero amplitude in the other time bins;

inserting quantum systems with at least two weak coherent states with non zero amplitude in at least two time bins between some of the quantum systems associated with symbols; and sending the quantum systems to the receiver station through an appropriate quantum channel.

28. The apparatus of claim 27, wherein the quantum system source of the emitter station comprises a mode-locked laser connected by an appropriate optical path to an amplitude modulator.

29. The apparatus of claim 27, wherein the quantum system source of the emitter station comprises a continuous wave laser connected by an appropriate optical path to an amplitude modulator.

30. The apparatus of claim 27, wherein the source comprises a variable optical attenuator.

31. A method for distributing a sequence of symbols and estimating information that an eavesdropper may know about a key generated therefrom, the method comprising the steps of:

a) sending, by an emitter station, of a stream of quantum systems, generated by a quantum system source, the quantum systems having a coherent phase relationship between systems located in nearby positions of the stream, and wherein the quantum systems are prepared in a quantum state belonging to a first set of quantum states, this set comprising at least two non-orthogonal quantum states, and the quantum states of this first set being associated with symbol values, b) inserting quantum system belonging to a second state between some of the quantum systems associated with symbols, this second set comprising at least one state, the states of this second set being non-orthogonal to some of the states of the first set, the states of this second set not being a superposition of some of the states of the first set, the states of this second set being selected in such a way that they are perturbed by a measurement adapted, when applied to a quantum system prepared in a state belonging to the first set, to determine at least in some cases in which state this quantum system was prepared c) performing, by the receiver, a first measurement on some of the quantum systems to try to determine in which of the quantum states they were prepared by the emitter station, d) performing, by the receiver, a second measurement on groups of at least two quantum systems, this measurement capable of obtaining information on the degree of coherence of the phase relationship existing between two quantum systems received by the receiver station;

e) performing, by the receiver, a third measurement on quantum systems, this measurement allowing, when applied to quantum systems prepared in a state belonging to the second set of quantum states, at least in some cases determination of whether they have been subjected, between the emitter and the receiver stations, to a measurement adapted, when applied to a quantum system prepared in a state belonging to the first set, to determining at least in some cases in which state this quantum system was prepared; and f) announcing to the emitter station the position in the stream of at least some of the quantum systems on which this first measurement yielded conclusive results, thereby allowing determination of which of the quantum states of the first set a particular quantum system had been prepared in and of which symbol had been sent by the emitter station, and, at least some of the measurement results of the second measurement and of the third measurement, and g) collaborating, by the emitter and the receiver stations, to assess the intensity of eavesdropping on a quantum channel, wherein the quantum system source of the emitter station produces for each of the symbol of the sequence to be transmitted to the receiver station over the quantum channel one quantum system prepared in a quantum state selected from a first set of at least two states, the said states consisting of a group of at least two weak coherent states of the electromagnetic field, each weak coherent states being located in a time bin of duration t, the center of such weak coherent states in a group being separated by a time T1 from the center of its closest neighbors, with T1 greater than t, the center of the last weak coherent state of one such group being separated from the center of the next weak coherent state emitted by the source by a time T2, with T2 greater than t, one weak coherent state of the group having non-zero amplitude while the other groups have zero amplitude, and wherein any two weak coherent states of a group are phase coherent and a weak coherent state of a group is phase coherent with any weak coherent state of another nearby group.

32. The method of claim 31, wherein the emitter station transmits to the receiver station the quantum systems over an appropriate quantum channel.

33. The method of claim 32, wherein the receiver station directs some of the received quantum systems to a detector unit allowing determination of the time of arrival of a photon with a resolution smaller than T1 and smaller than T2, thereby allowing in some cases determination of which quantum state a quantum system had been prepared in by the emitter station.

34. The method of claim 33, wherein the receiver station announces to the emitter station the position in the stream of at least some of the quantum systems on which the immediately above measurement yielded conclusive results, thereby indicating to the emitter station which symbol could contribute to the raw key.

35. The method of claim 34, wherein the receiver station directs some of the received quantum systems to an optical device which measures the quantum systems by superposing at least two weak coherent states from different quantum systems in such a way that they destructively interfere if they are phase coherent and sending the superposed state to at least one detector unit allowing determination of the time of arrival of a photon with a resolution smaller than T1 and smaller than T2.

36. The method of claim 35, wherein the receiver station announces at least some of the measurements results of the immediately above measurement, thereby allowing the emitter and receiver stations to collaborate to estimate the amount of information known by an eavesdropper on the raw key.

37. The method of claim 36, wherein the emitter station inserts between some quantum systems prepared in one of the states of the first set, a quantum system comprising at least two weak coherent states with non-zero amplitude in at least two time bins.

38. The method of claim 37, wherein the receiver station directs some of the received quantum systems to an optical device which measures the quantum systems by superposing at least two weak coherent states from a single quantum system in such a way that they destructively interfere if they are phase coherent and sending the superposed state to at least one detector unit allowing determination of the time of arrival of a photon with a resolution smaller than T1 and smaller than T2.

39. The method of claim 38, wherein the receiver station announces at least some of the results of the immediately above measurement, thereby allowing the emitter and receiver stations to collaborate to estimate the amount of information known by an eavesdropper on the raw key.

40. An apparatus for distributing a sequence of symbols between an emitter station and a receiver station connected by a quantum channel, wherein the symbols are coded on quantum systems belonging to a first set of at least two non-orthogonal quantum states, wherein the apparatus assesses the amount of information an eavesdropper having access to both of the channels can have obtained on the sequence, and wherein the emitter station comprises a stream generating subsystem for generating a stream of quantum systems having a coherent phase relationship between neighboring quantum systems, the receiver station comprises a coherence reduction revealing subsystem for revealing the reduction caused by the eavesdropper of the coherence between some of the quantum systems, the emitter station comprises an insertion subsystem for inserting between some of the quantum systems of the stream at least one witness state such that it is modified by a measurement performed by the eavesdropper on this witness state and another quantum system, this measurement being selected by the eavesdropper to leave the coherent phase relationship between two quantum systems unmodified, and the receiver comprises medication revealing subsystem for revealing the modification caused by an eavesdropper of at least some of the witness states.

41. A method for distributing a sequence of symbols between an emitter station and a receiver station connected by a quantum channel, wherein the symbols are coded on quantum systems belonging to a first set of at least two non-orthogonal quantum states and wherein the apparatus assesses the amount of information an eavesdropper having access to both of the channels can have obtained on the sequence, the method including the Steps of:
- (a) generating by the emitter station of a stream of quantum systems having a coherent phase relationship between neighboring quantum systems,
- (b) detecting by the receiver station of the reduction caused by the eavesdropper of the coherence between some of the quantum systems,
- (c) inserting by the emitter station between some of the quantum systems of the stream at least one witness state such that it is modified by a measurement performed by the eavesdropper on this witness state and another quantum system, this measurement being selected by the eavesdropper to leave the coherent phase relationship between two quantum systems unmodified, and
- (d) determining by the receiver station of any modification caused by the eavesdropper of at least some of the witness states.

42. A secure key produced using the method of claim 41, wherein the key is distilled from a raw key made up of data-carrying quantum systems which arc transmitted from the emitter station to the receiver station, into the secure key using a key distillation method.

43. A raw key produced using the method of claim 41, wherein the raw key is made up of data-carrying quantum systems which are transmitted from the emitter station to the receiver station.

44. An apparatus for distributing a sequence of symbols between an emitter station and a receiver station connected by a quantum channel, wherein the symbols are coded on quantum systems belonging to a first set of at least two non-orthogonal quantum states, wherein the apparatus assesses the amount of information an eavesdropper having access to both of the channels can have obtained on the sequence, and wherein the emitter station is adapted to generate a stream of quantum systems having a coherent phase relationship between neighboring quantum systems, the receiver station is adapted to reveal the reduction caused by the eavesdropper of the coherence between some of the quantum systems, the emitter station is adapted to insert between some of the quantum systems of the stream at least one witness state such that it is modified by a measurement performed by the eavesdropper on this witness state and another quantum system, this measurement being selected by the eavesdropper to leave the coherent phase relationship between two quantum systems unmodified, and the receiver is adapted to reveal the modification caused by the eavesdropper of at least some of the witness states.

* * * * *

UNITED STATES PATENT AND TRADEMARK OFFICE
CERTIFICATE OF CORRECTION

| | | |
|---|---|---|
| PATENT NO. | : 7,929,690 B2 | |
| APPLICATION NO. | : 11/574454 | |
| DATED | : April 19, 2011 | |
| INVENTOR(S) | : Nicolas Gisin et al. | |

It is certified that error appears in the above-identified patent and that said Letters Patent is hereby corrected as shown below:

In Col. 13, line 38, replace the phrase "center of each weak coherent slate" with --center of each coherent state--.

In Col. 14, line 67, replace the phrase "non-orthogonal stales" with --non-orthogonal states--.

In Col. 15, line 7, replace the phrase "sonic cases" with --some cases--.

In Col. 18, line 63, replace the phrase "sct by a time T2, with" with --set by a time T2, with--.

In Col. 22, line 16, replace the phrase "arc transmitted from the" with --are transmitted from the--.

Signed and Sealed this
Ninth Day of August, 2011

David J. Kappos
*Director of the United States Patent and Trademark Office*